United States Patent [19]
Williams et al.

[11] Patent Number: 5,470,677
[45] Date of Patent: Nov. 28, 1995

[54] ELECTROLYTE GEL

[75] Inventors: Joel L. Williams, Cary; Tal M. Nahir, Raleigh, both of N.C.; Yong-Jian Qiu, Myrtle Beach, S.C.

[73] Assignee: Becton, Dickinson and Company, Franklin Lakes, N.J.

[21] Appl. No.: 153,509

[22] Filed: Nov. 17, 1993

[51] Int. Cl.⁶ ..................................................... H01M 6/18
[52] U.S. Cl. ............................................ 429/190; 429/192
[58] Field of Search ................................... 429/190, 192, 429/194

[56] References Cited

U.S. PATENT DOCUMENTS

| | | |
|---|---|---|
| 3,855,137 | 12/1974 | Whitney . |
| 4,845,137 | 7/1989 | Williams et al. . |
| 4,996,334 | 2/1991 | Kaitoh et al. ............................ 549/364 |
| 5,176,969 | 1/1993 | Miyabayashi et al. ................. 429/212 |
| 5,186,972 | 2/1993 | Williams et al. . |
| 5,326,657 | 7/1994 | Suga et al. ............................. 429/192 |

OTHER PUBLICATIONS

M. Miyano et al. *Macromolecules* 24, 4755–61 (1991) (Month N/A).
M. Watanabe et al. *J. of Polymer Science* 21, 939=948 (1983) (Month N/A).

*Primary Examiner*—Prince Willis, Jr.
*Assistant Examiner*—M. Nuzzolillo
*Attorney, Agent, or Firm*—Richard E. Brown

[57] ABSTRACT

A self supporting gel includes a gelling agent and an electrolyte dissolved in a solvent. The gel is conducting and may be used in a battery.

5 Claims, 1 Drawing Sheet

ELECTROLYTE GEL

BACKGROUND OF THE INVENTION

1. Field of the Invention

This invention relates to electrochemical cells and more particularly relates to a gel containing an electrolyte.

2. Background of the Invention

Devices that convert chemical energy into electrical energy are commonly referred to as batteries. Primary batteries contain compounds of high chemical energy which are converted to compounds of low chemical energy when electrical energy is withdrawn. These batteries are discarded when exhausted. Fuel cells are a special class of primary batteries.

With secondary batteries, electrical energy may be put back into the battery to convert the low energy compounds back to the high energy compounds. This process, known as recharging, allows secondary batteries to be used over and over.

Batteries may be of one or more individual electrochemical cells. A cell includes a negative electrode (anode) and a positive electrode (cathode) separated by an electrolyte solution. Ions migrate through the electrolyte solution between the anode and the cathode.

Commonly used liquid electrolytes are sulfuric acid in lead-acid batteries and potassium hydroxide in nickel-cadmium and silver-zinc batteries. Liquid electrolytes have the advantages of excellent contact between the electrodes and the electrolyte solution and ease of transport of ionic species through the solution so that very high conductivity is achieved. (In the present disclosure, conductivity is given by the term $S \times cm^{-1}$ wherein S designates siemans (reciprocal ohms)). Disadvantages associated with liquid electrolytes are the potential for leakage and the requirement that the battery be used in a prescribed (usually vertical) position.

Electrically conductive solids with ionic carriers have been disclosed for potential applications where liquid electrolytes cannot be used. Most solid electrolytes are inorganic materials such as ceramics or compacted tablets. With such materials, difficulties are often encountered in maintaining close contact with the electrodes and in developing sufficient conductivity.

One type of solid electrolyte which has been proposed is a polymer containing ions. Exemplary of these polymeric electrolytes are ionic species such as hydrated perchlorates in polyacrylonitrile, polyethyleneoxide, and polyvinylidene fluoride. Conductivities in the range of $10^{-7}$ to $10^{-2}$ S cm$^{-1}$ have been reported, and deformation under stress which helps maintain close electrolyte-electrode contact has been claimed.

Gels have also come into use to immobilize electrolyte systems in batteries for consumer applications, such as emergency lighting and alarm-security systems. Exemplary of such systems is a thixotropic gel obtained by mixing sodium silicate, demineralized water and dilute sulfuric acid.

While much progress has been made in overcoming the disadvantages of liquid electrolytes by using solid electrolytes and crosslinked gels, there remains a need for a self-supporting electrolyte having the conductivity of a liquid electrolyte. It is toward solution of this problem that this invention is directed.

SUMMARY OF THE INVENTION

A thermally reversible conducting gel includes an ether of a polyhydroxy compound and an electrolyte in an organic solvent. Preferred components are sorbitol ethers as the gelling agents and ammonium perchlorates as the electrolytes. Preferred solvents are acetonitrile, propylene carbonate and dichlorobenzene. The gel may also include a polymer for improved strength and dimensional stability.

The conducting gels disclosed herein are noncorrosive, self supporting, dimensionally stable and not subject to leakage. They have conductivities which are substantially the same as the non-gelled liquids. These features make the gels of the invention ideally suited for use in consumer products requiring batteries to be used in any position.

BRIEF DESCRIPTION OF THE DRAWINGS

The FIGURE is a plot showing the relationship of viscosity to temperature for electrolytes of the invention in gel and liquid forms.

DETAILED DESCRIPTION

Figure 1:
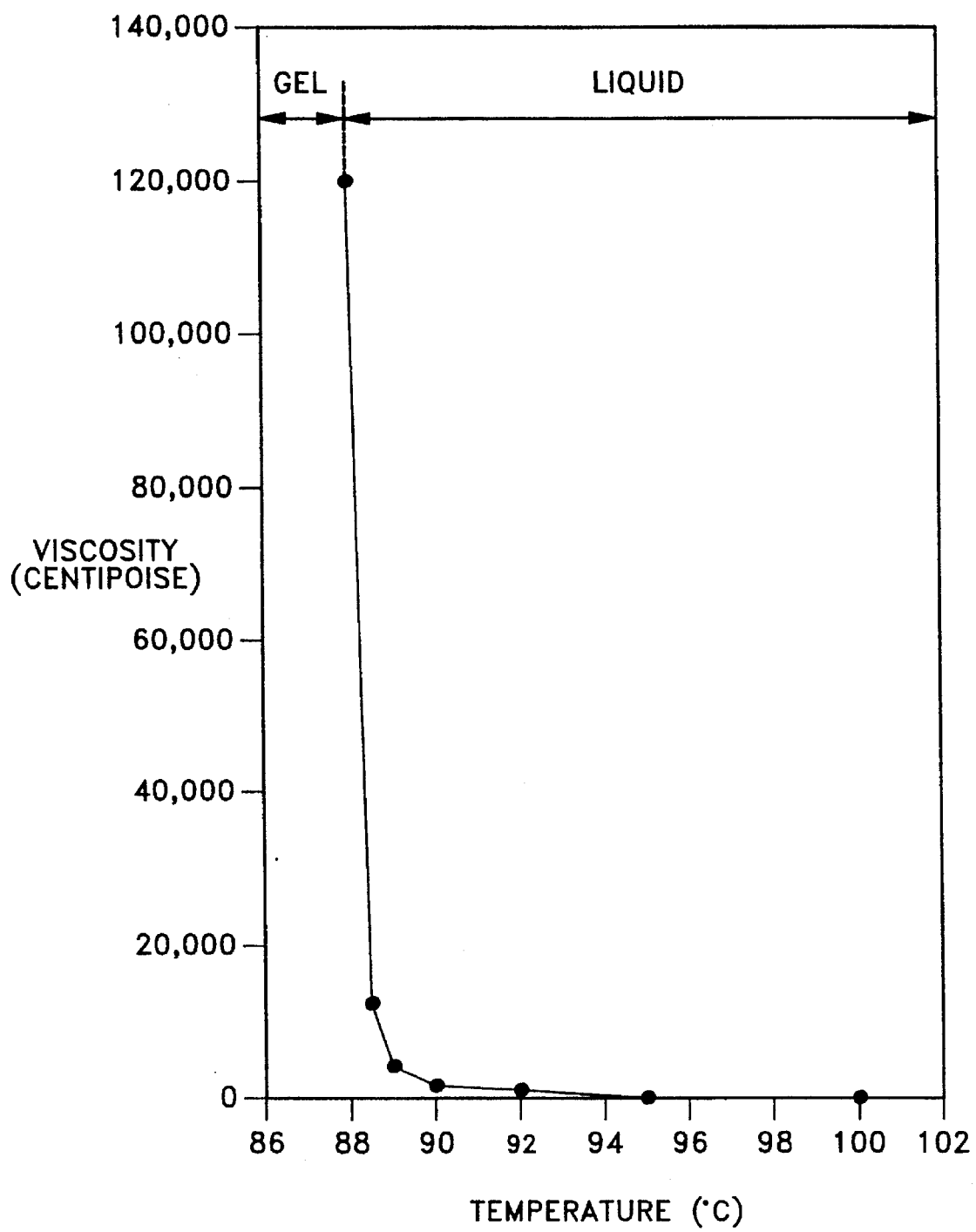

While this invention is satisfied by embodiments in many different forms, there will herein be described in detail preferred embodiments of the invention, with the understanding that the present disclosure is to be considered as exemplary of the principles of the invention and is not intended to limit the invention to the embodiments illustrated and described. The scope of the invention will be measured by the appended claims and their equivalents.

In accordance with the present invention, conducting electrolyte gels are formed by dissolving a gelling agent and an ionic electrolyte in a suitable solvent at a temperature above the gelation point and cooling the solution. The gels of the invention are useful as electrolyte mediums in batteries, fuel cells and various sensing devices which measure current flow.

Suitable gelling agents in accordance with the invention are ethers of polyhydroxy compounds such as xylitol, mannitol, pentaerythritol and sorbitol. Particularly preferred gelling agents are ethers of 1,3:2,4-sorbitols such as dibenzyl sorbitol, dibenzylidene sorbitol (DBS) and ring substituted derivatives of DBS such as 4,4'-dimethyl dibenzylidene sorbitol (MDBS), 4,4'-dichlorodibenzylidene sorbitol (CDBS) and 4,4'-bis(methylthio)dibenzylidene sorbitol (MTDBS). As known in the art, these compounds are clarifying agents for polymeric compositions. A concentration of about 0.01 to 2.0, preferably about 0.1 to 0.2% by weight of the gelling agent may be used.

Any substance which is soluble and ionized in the organic solvent may serve as the electrolyte. Metal salts or preferably ammonium salts may be used, such as lithium, sodium and potassium perchlorates, fluoroborates and tetraphenylborates. Preferred salts are substituted ammonium perchlorates, most preferably tetrabutyl ammonium perchlorate (TBAP). The concentration of the salt may be about 0.001 to 5 molar, preferably about 0.05 to 1 molar.

A variety of organic solvents may be used in formation of the gel of the invention. Any solvent which forms a stable gel with the gelling agent and which dissolves an ionic electrolyte may be used. A representative, but not exhaustive, list of suitable solvents is acetonitrile (AN), chloroform, dichloromethane, propylene carbonate (PC), nitrobenzene and o-dichlorobenzene (DCB). Other solvents will be readily evident to one skilled in the art. Dimethylformamide and pyridine did not form gels with DBS and partial gels were formed in benzene and toluene.

A mixture of the gelling agent, electrolyte and solvent may be heated to any suitable temperature above the gelling temperature to dissolve the electrolyte and gelling agent. Generally, a temperature of 50° to 150°, most preferably about 80° to 120° C. is sufficient to give a homogeneous composition. The temperature of gelling depends on the nature of the gelling agent and solvent and the concentration of the gelling agent.

For some applications, it maybe advantageous to add a polymer to the solution prior to gelling to provide additional mechanical strength and dimensional stability to the gel. Suitable polymers are, for example, polyvinyl acetate, polyvinylchloride, polystyrene, polymethylmethacrylate, and polyvinylpyridine. The polymer may be added in amounts ranging from about 1–20, preferably about 10 percent by weight based on the weight of solvent.

Conductivity of the gel may be determined by impedance measurements in an electrochemical cell using platinum electrodes, as described in Example II. It was found that pure solvent and the corresponding DBS gel, in the absence of electrolyte, gave the same very low conductivities, indicating that DBS is electrochemically inactive in the gel form. The inert electrochemical nature of DBS was confirmed by cyclic voltammetry studies, as described in Example III.

It is believed, but not yet substantiated, that the gel of the invention forms by precipitation of DBS into a dense, open network of twisted filaments in which the solvent is entrapped by capillary forces to prevent leakage and allow fast transport of both ionic and neutral molecular species.

EXAMPLE I

A. Preparation of Gels.

DBS, 0.1 g, was added to 10 ml of each of the solvents listed below, and the mixtures heated on a hot plate until all DBS dissolved. The solutions gelled on cooling. The gelation process was thermo-reversible. The gels were colorless and clear or slightly cloudy.

| SOLVENT | GELATION |
| --- | --- |
| o-dichlorobenzene | yes |
| acetonitrile | yes |
| nitrobenzene | yes |
| propylene carbonate | yes |
| chloroform | yes |
| methylene chloride | yes |
| toluene | partial |
| xylene | partial |
| dimethylformamide | no |
| pyridine | no |

B. Characterization of Gels

The rotating spindle of an LVT SYNCHRO-LECTRIC™ Brookfield Viscometer (Brookfield Engineering Laboratories, Stoughton, Mass.) was immersed in a beaker containing 100 ml of a 1% solution of DBS in o-dichlorobenzene at 110° C. The solution was cooled at 0.5° C./min. with continuous monitoring of the viscosity. The gelation transition point occurred at 88°–89° C. as evidenced by a sudden increase in the fluid viscosity. At this temperature, the mixture became semisolid and stopped the spindle. The gel was converted back to the liquid form at about 110° C. The results of this experiment are shown in the FIGURE.

EXAMPLE II

Determination of Conductivity

Duplicate solutions (10 ml) of 0.125M TBAP in acetonitrile, propylene carbonate and o-dichlorobenzene were prepared, and 0.1 g of DBS was added to one solution of each solvent. The solutions containing DBS gelled as described in Example I. Two platinum electrodes were placed 1 cm apart in each solution and gel to form an electrochemical cell, and impedance measurements were made at ambient temperature using a SOLARTRON™ (Fornborough, England) 1250 frequency analyzer and a SOLARTRON™ 1186 electrochemical interface operating at 10 mV root mean squared at a frequency range from 65 kHz to 0.5 Hz. Conductivities were calculated using the high frequency real-axis-intercept values. The data obtained is set forth in the Table.

TABLE

| | Conductivity ($S \times cm^{-1}$) | | | |
| --- | --- | --- | --- | --- |
| Solvent | Pure | DBS gel | Pure + TBAP | DBS gel + TBAP |
| AN | $2 \times 10^{-8}$ | $1 \times 10^{-5}$ | $4 \times 10^{-2}$ | $4 \times 10^{-2}$ |
| PC | $3 \times 10^{-5}$ | $3 \times 10^{-5}$ | $8 \times 10^{-3}$ | $7 \times 10^{-3}$ |
| DCB | $5 \times 10^{-7}$ | $5 \times 10^{-7}$ | $7 \times 10^{-4}$ | $7 \times 10^{-4}$ |

It is seen that pure solvent and the corresponding DBS gel give substantially the same low order of conductivity in the absence of the electrolyte. In the presence of electrolyte, conductivity of pure solvent and gel are likewise substantially the same for each solvent and up to 1000 fold higher than in the absence of electrolyte.

EXAMPLE III

Voltammetry Studies

Cyclic voltammetry studies were performed with an EG&G PAR 363 (Princeton Applied Research, Princeton, N.J.) potentiostat controlled by an EG&G PAR 175 programmer and the data were collected using a Nicolet 310 digital oscilloscope (Madison, Wis.) Platinum coated molybdenum wire (0.457 mm o.d.) was used for both working and counter electrodes, and Ag wire (0.5 mm o.d.) served as a quasi-reference electrode. The electrode area was 0.36 cm² and the scan rate was fixed at 200 mV/s during the experiments.

Plots of current vs voltage of 0.125M TBAP in acetonitrile and the corresponding gel with DBS were compared. It was found that the two curves were substantially superimposable, showing that DBS in the gel is electrochemically inert and has substantially no effect on the conductivity of the solvent-electrolyte system.

What is claimed is:

1. An electrochemical cell comprising a negative electrode, a positive electrode and a thermally reversible conducting electrolyte gel there-between, said gel comprising an organic solvent, an electrolyte soluble in said organic solvent and a gelling agent selected from the group consisting of dibenzylsorbitol, dibenzylidene sorbitol, 4,4'-dimethyl dibenzylidene sorbitol, 4,4'-dichlorodibenzylidene sorbitol, and 4,4'-bis(methylthio)dibenzylidene sorbitol.

2. The gel of claim 1 wherein said organic solvent is selected from the group consisting of o-dichlorobenzene, acetonitrile, nitrobenzene, propylene carbonate, chloroform and methylene chloride.

3. The gel of claim 1 further comprising a polymer dissolved in said organic solvent.

4. The gel of claim 1 wherein said electrolyte is a salt selected from the group consisting of ammonium, sodium, lithium and potassium perchlorates, fluoroborates and tetraphenylborates.

5. An electrochemical cell comprising a negative electrode, a positive electrode and a thermally reversible conducting electrolyte gel therebetween, said gel comprising propylene carbonate, 1,3:2,4-dibenzylidene sorbitol, tetrabutyl ammonium perchlorate and polyvinylacetate.

* * * * *